Dec. 23, 1952        H. M. DODGE        2,622,275
APPARATUS FOR MOLDING AND VULCANIZING HOLLOW RUBBER ARTICLES
Filed Feb. 25, 1950        4 Sheets-Sheet 1

INVENTOR
Howard M. Dodge
BY Evans & McCoy
ATTORNEYS

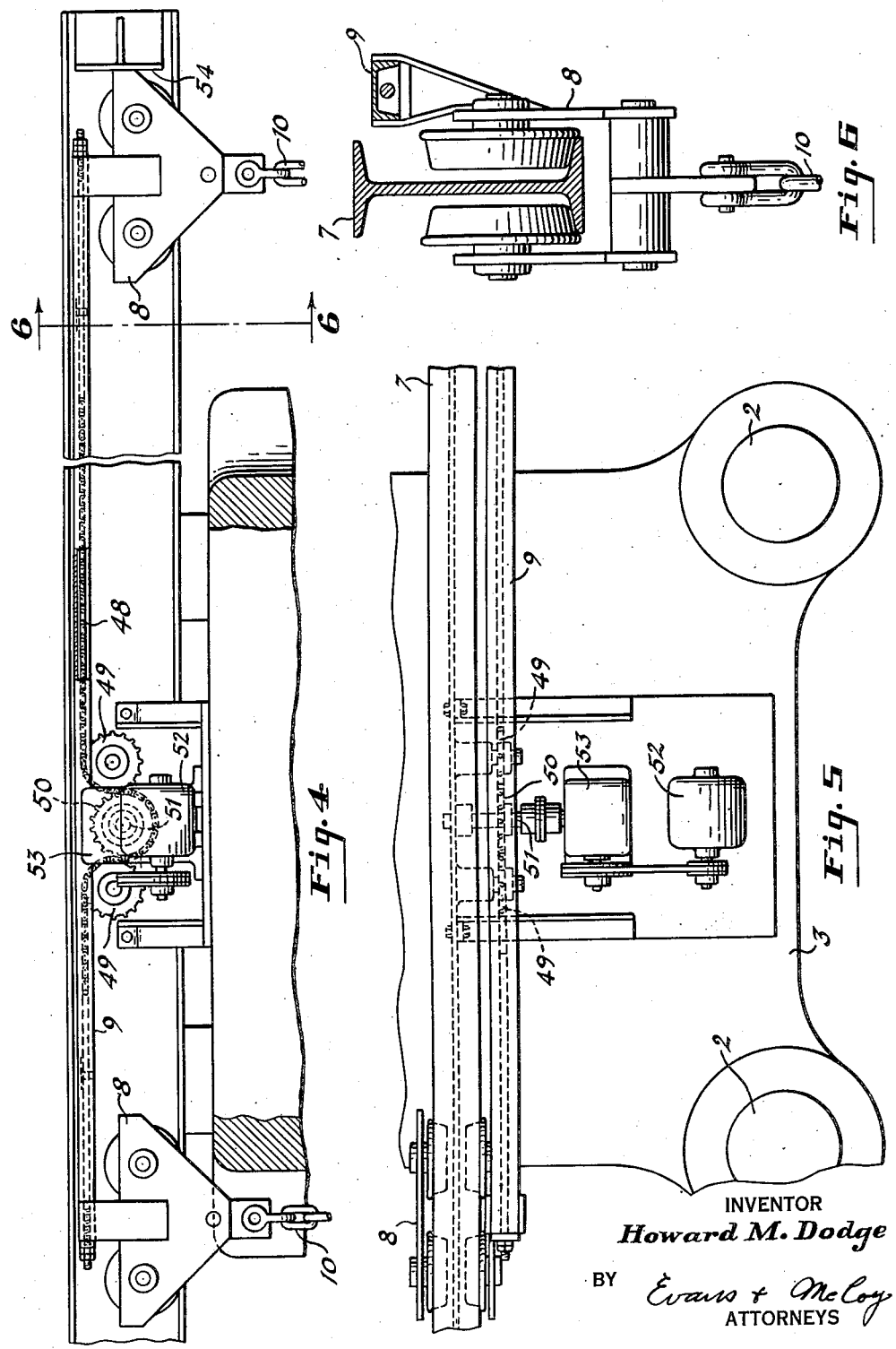

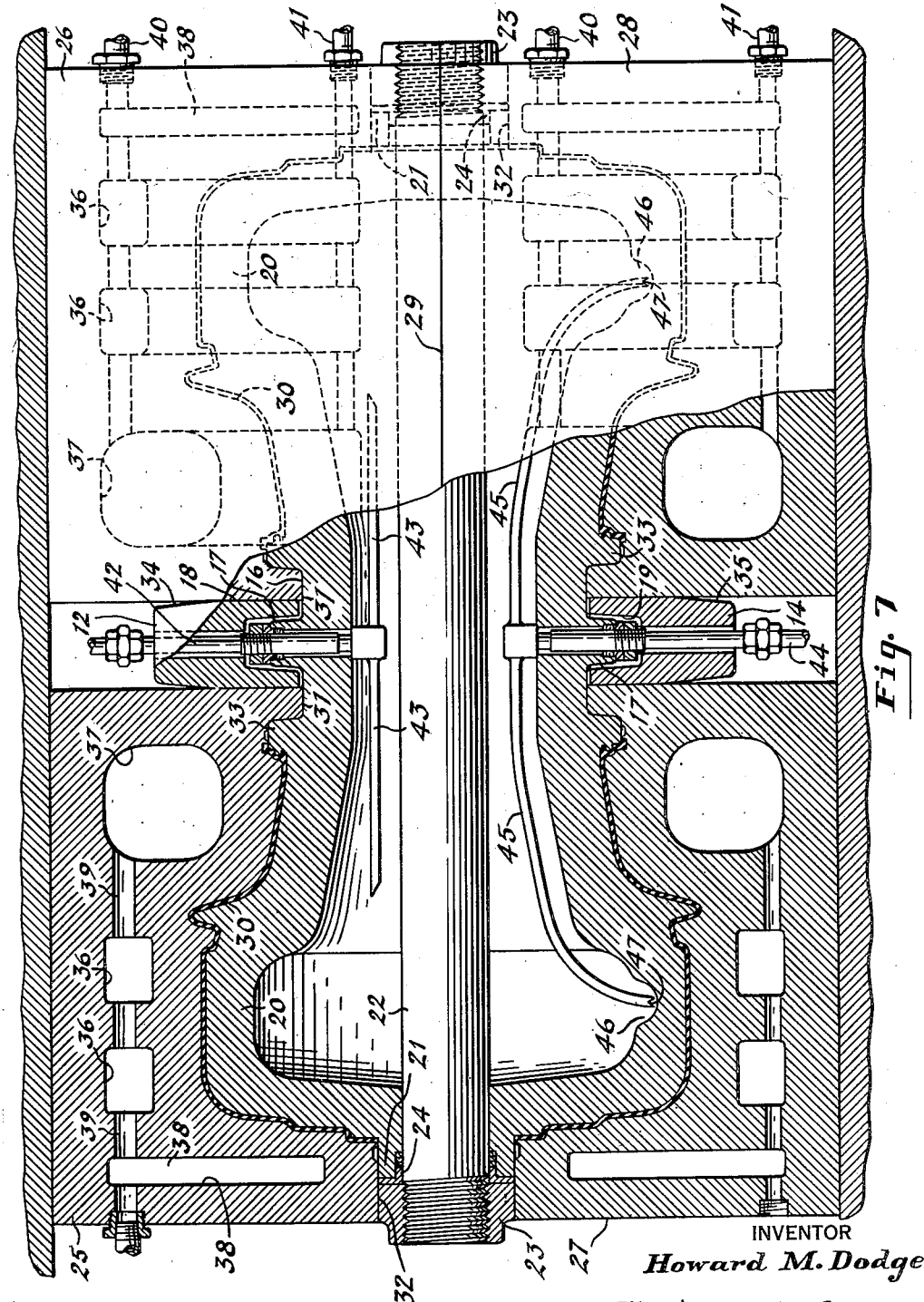

Patented Dec. 23, 1952

2,622,275

UNITED STATES PATENT OFFICE 2,622,275

APPARATUS FOR MOLDING AND VULCANIZING HOLLOW RUBBER ARTICLES

Howard M. Dodge, Wabash, Ind., assignor to The General Tire and Rubber Company, Akron, Ohio, a corporation of Ohio Application February 25, 1950, Serial No. 146,369

11 Claims. (Cl. 18—16)

This invention relates to apparatus for molding and vulcanizing hollow rubber articles, particularly for molding and vulcanizing hollow elastic rubber articles of large size such as flexible washing machine tubs.

The invention has for an object to provide a mold for hollow rubber articles that is provided with core handling mechanism by means of which the cores with the articles molded and vulcanized thereon can be quickly and easily moved from the molding position to a stripping position laterally clear of the mold.

It is also an object of the invention to provide a vulcanizing press having a battery of molds, together with a single core carrier mounted for movement from a molding position to a stripping position laterally clear of the molds.

An additional object of the invention is to provide a laterally movable core carrier that carries a core member that is centrally supported thereon and that is provided with core portions at its opposite ends and on opposite sides of the carrier that are adapted to be positioned in separate molds.

A further object is to provide efficient means in connection with the movable core carrier for supplying steam to the cores and draining condensate therefrom.

Reference should be had to the accompanying drawings forming a part of this specification, in which:

Fig. 4 is a fragmentary front elevation of the core carrying and supporting track;

Fig. 5 is a fragmentary top plan view of the press showing the carriage actuating mechanism;

Fig. 6 is a vertical section through the track and carriage, taken on the line indicated at 6—6 in Fig. 4; and Fig. 7 is a fragmentary vertical section on an enlarged scale taken centrally through a core member and longitudinally thereof, the section being indicated by the lines 7—7 in Fig. 2.

Figure 1:
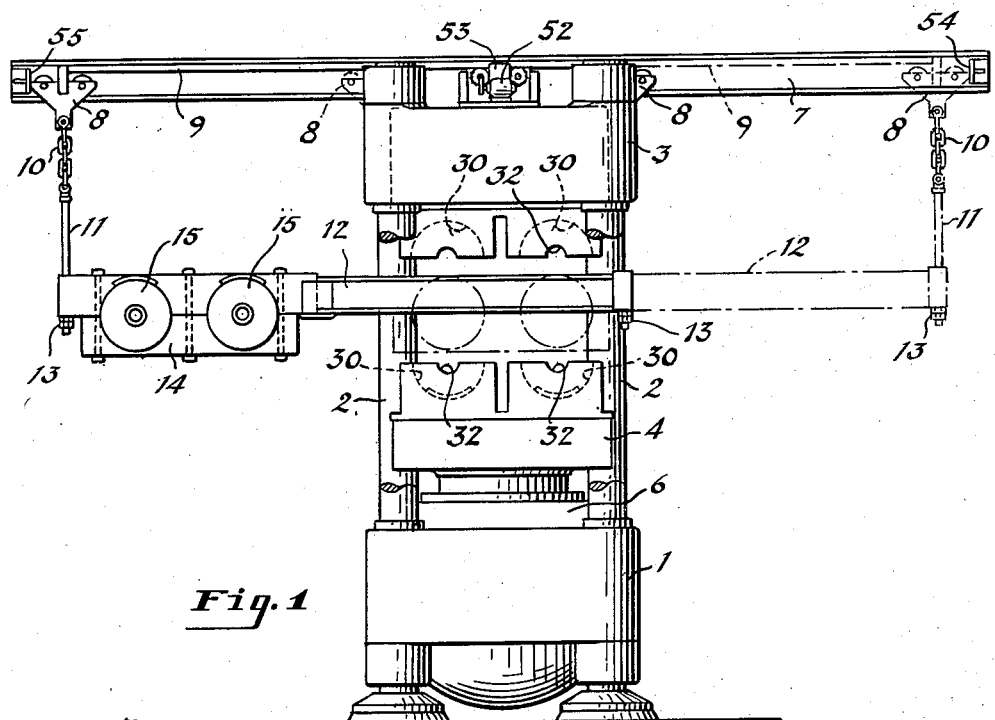
Figure 1 is a front elevation of vulcanizing apparatus embodying the invention showing the molds opened.
Figure 2:
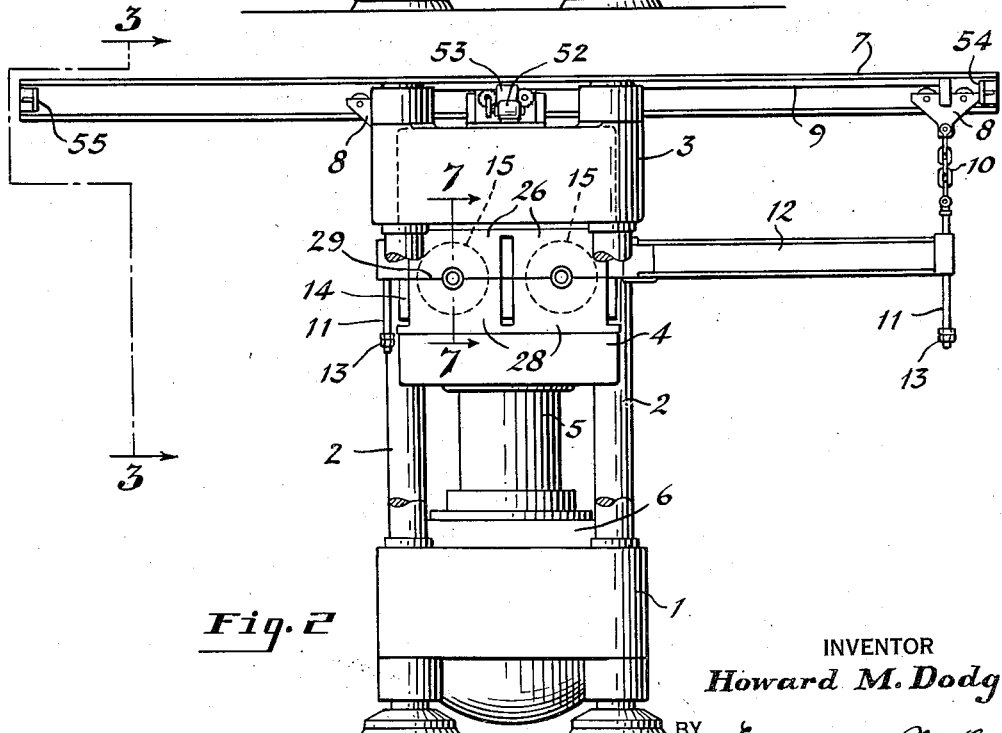
Fig. 2 is a front elevation showing the molds closed.

In the accompanying drawings the invention is shown applied to a vulcanizing press having a base 1, vertical standards 2, a top platen 3 mounted on the upper ends of the standards, and a bottom platen 4 guided for vertical movement on the standards. The platen 4 is carried by a ram 5 operating in a hydraulic cylinder 6 mounted in the base. Upon the top of the press there is mounted an I-beam track 7 that is disposed horizontally centrally of the press platens and that projects past opposite sides of the press. Two identical trolleys 8 are mounted on the track 7, the trolleys 8 being disposed on opposite sides of the press. The trolleys 8 are connected by a rigid bar 9 that extends parallel to the track 7, the trolleys 8 with the bar 9 forming a carriage that travels on the track 7 and that extends across the top of the vulcanizing press.

Figure 3:
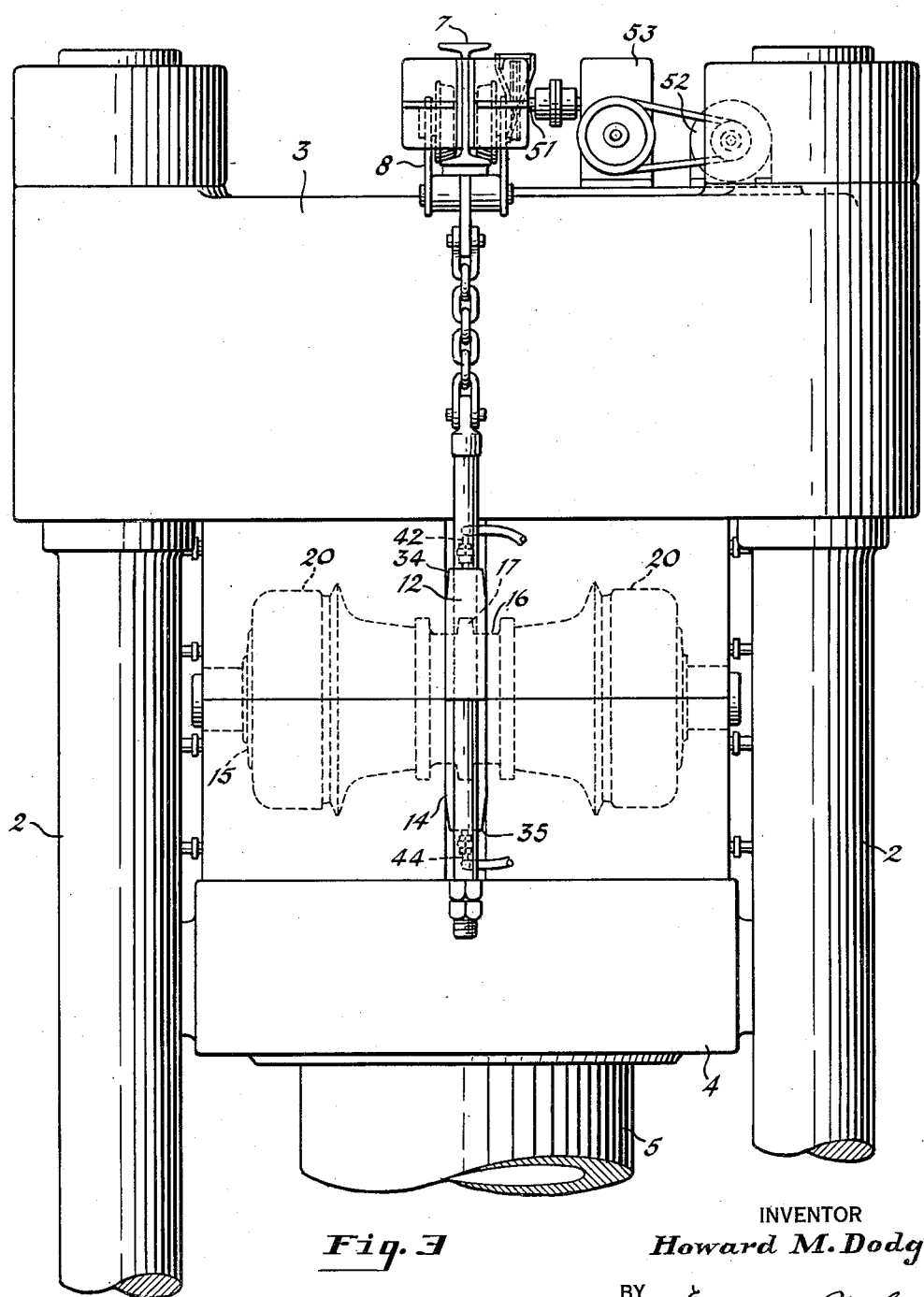
Fig. 3 is a fragmentary side elevation viewed as indicated by the arrows 3—3 in Fig. 2.

A chain 10 is suspended from each of the trolleys 8 and guide rods 11 are suspended from the lower ends of the chains 10. A horizontal carrier bar 12 is slidably mounted at its ends on the flexibly suspended rods 11 and is normally supported in a position substantially midway between the top and bottom platens 3 and 4 and centrally thereof by means of nuts 13 on the lower ends of the rods 11. Adjacent one end thereof the bar 12 has a clamping section 14 bolted to its under side that serves to rigidly clamp a plurality of hollow core members 15 that are received between the bar sections. As best shown in Figs. 3 and 7, the core member 15 has a central reduced portion 16 that is clamped between the carrier bar sections 12 and 14, the meeting faces of which are recessed to receive the core member between them. The core member has a central circumferential rib 17 that extends into grooves 18 and 19 formed in the recessed portions of the carrier bar sections 12 and 14.

The core members 15 have enlarged end portions 20 shaped to conform to the interior of the hollow article to be molded, and are provided at each end with a tubular extension 21 of reduced diameter. Each core member is stiffened by a centrally disposed tubular member 22 that extends axially through the core member, fitting within the tubular extensions 21 at the ends of the core members and projecting past the extensions 21. The ends of the tube 22 are threaded to receive nuts 23 which are screwed against the tubular extensions 21 and have cylindrical peripheries of the same diameter as the tubular extensions 21. Sealing rings 24 clamped between the nuts 23 and the ends of the extensions 21 serve to prevent leakage of steam from the interior of the core members.

Each core member 15 is associated with a pair of spaced top mold sections 26 and a pair of spaced bottom mold sections 28. The top mold sections 26 are attached to the under side of the top platen 3. The bottom mold sections 28 are attached to the bottom platen 4 in vertical alinement with the top mold sections 26. The top and bottom mold sections have flat meeting faces 29 in which registering mold cavities 30 are provided, the mold cavities 30 being shaped to conform to the exterior of the hollow article to be molded. Each of the mold sections is provided with semi-circular positioning recesses 31 and 32 at opposite ends of its mold cavity 30 which engage with portions of the core members to clamp the same between the mold sections and to position the portions 20 thereof in the mold cavities.

The inner positioning recesses 31 have clamping engagement with the centrally reduced portions 16 of the core members and with positioning ribs 33 formed on the core members at opposite sides of the reduced portions 16 thereof. The positioning recesses 32 at the outer ends of the mold cavities have clamping engagement with the axial projections at the ends of the core members that are formed by the tubular extensions 21 and cylindrical nuts 23.

The mold sections 26 and 28 of each pair are spaced apart a distance corresponding substantially to the thickness of the carrier bar 12 and when the mold is closed the carrier bar fitting between the mold sections serves to accurately position the core member with respect to the mold sections. To facilitate the entry of the bar sections 12 and 14 into the spaces between the mold sections, the bar may be provided at the top with upwardly tapering side faces 34 and at the bottom may be provided with downwardly tapering side faces 35, so that when the mold is closing the flexibly supported carrier bar will be guided into the spaces between the mold sections.

As shown in Fig. 7, the mold sections are provided with arcuate steam chambers 36 and 37 which extend circumferentially of the mold cavity, and with chambers 38 that overlie end portions of the mold cavity. The steam chambers 36, 37 and 38 are connected by suitable transverse passages 39, steam being supplied to the mold sections through suitable connections 40 and condensate being drained from the mold sections through suitable connections 41, the drain connections 41 being connected to the lowermost portions of the steam chambers.

Steam is supplied to the interior of the hollow core members through a steam supply pipe 42 extending vertically through the carrier bar 12, the lower end of the pipe 42 having laterally extending branches 43 within the core members. A vertically disposed drain pipe 44 is mounted in the clamping section 14 of the carrier bar and is connected to tubes 45 extending in opposite directions from its upper end within the core section, the tubes 45 being downwardly curved and extending to the lowermost portions of the interior of the core. In order to limit the amount of condensate permitted to accumulate within the core and to prevent escape of steam, the open ends of the tubes 45 are positioned in pockets or depressions 46 in the bottom of the core cavity, and have notched ends 47 to facilitate flow of liquid from the pocket into the tubes. The pressure of steam within the core member will force the condensate from the pockets 46 into the branch tubes 45 and through the tubes 45 to the pipe 44.

Power actuated mechanism is preferably provided for moving the core carrier to shift the cores from their molding position to a stripping position laterally clear of the vulcanizing press. As shown in Fig. 4, a sprocket chain 48 is attached at its opposite ends to the opposite ends of the carriage bar 9 and intermediate its end runs over a pair of stationary guide sprockets 49 mounted on the top of the press. Between the sprockets 49 the chain 48 runs under a drive sprocket 50 that is attached to a horizontal shaft 51 that is driven by an electric motor 52 mounted on the top of the press and driving the shaft 51 through suitable reduction gearing in a housing 53.

Stops 54 and 55 are provided on the overhead track 7 for limiting movement of the core shifting carriage, the stop 54 being positioned to stop the carriage with the core members in vertical alinement with the mold cavities. The motor 50 is controlled by suitable switches, not shown, such as a push button starting switch and limit switches which operate at the ends of travel of the carriage.

In the operation of the apparatus pieces of sheeted unvulcanized rubber are placed upon the tops of the enlarged portions 20 of the core members and in the cavities of the bottom mold sections while the mold is open, and the core members are positioned as shown in Fig. 1 of the drawings. The carriage is then shifted from the full line position shown in Fig. 1 to the dotted line position in which the core members 15 are substantially in vertical alinement with the mold cavities between the top and bottom mold sections. With the core members so positioned pressure is applied to the ram 5 to move the bottom platen 4 vertically. During upward movement of the platen the recesses 31 and 32 of the bottom mold sections come into engagement with the central portion 16 and the end extensions 21 of the core members, after which the core members move with the platen 4 and bottom mold sections. The slidable mounting of the bars 12 on the rods 11 permits vertical movement of the carrier bar 12 so that the core members can move with the bottom mold sections into engagement with the top mold sections where the end and central portions of the core members are clamped between the mold sections and the core members are positioned with respect to the mold sections as shown in Fig. 7 of the drawings. The flexible suspension of the rods 11 permits the carrier bar to have slight longitudinal and lateral movements as the core members 15 engage in the positioning recesses of the mold sections and as the carrier bar enters the spaces between the mold sections.

As the mold is closed the sheets of rubber placed upon the core members and in the bottom mold cavities are compressed between the exterior of the core and the walls of the mold cavities and caused to flow and fill the spaces between the core members and mold sections, the volume of rubber in the unvulcanized sheets placed upon the core members and in the bottom mold cavities being that required to fill the spaces between the cores and cavities of the mold sections to form hollow articles on the core members.

After the mold is closed steam is admitted to the mold sections and into the cores for a period of time sufficient to vulcanize the hollow rubber articles that have been molded between the cores and mold sections.

After the molded articles have been vulcanized the platen 4 is lowered, allowing the core carrier 12 to slide down the suspension rod until it engages the nuts 13, after which the lower mold sections will move away from the core members, freeing the same so that the carriage supporting the core carrier 12 can move laterally to the position shown in full lines in Fig. 1, in which position the molded and vulcanized articles are stripped from the core members.

It is to be understood that in accordance with the provisions of the patent statutes, variations and modifications of the specific devices herein shown and described may be made without departing from the spirit of the invention.

What I claim is:

1. Apparatus for molding hollow rubber articles comprising two mold clamping supports mounted for relative clamping and releasing movements, spaced mold sections on each support, the mold sections of one support being alined with the mold sections of the other and having opposed engaging faces provided with registering cavities that conform to the exterior of articles to be molded when said faces are engaged, a bar positioned between said supports in alignment with the spaces between the mold sections, cores shaped to conform to the interiors of articles to be molded, attached to said bar and projecting in opposite directions therefrom to provide free ends from which molded articles may be stripped, and a support for said bar mounted for movement transversely with respect to said clamping and releasing movements of the mold supports, said bar support being movable when the mold sections are separated in a direction to carry the bar endwise from a position in which said cores are positioned between and alined with the mold cavities to a stripping position in which the cores are out from between the mold sections and clear of the mold.

2. Apparatus for molding hollow rubber articles comprising two supports having relative clamping and separating movements, spaced mold sections on each support, the mold sections of one support being alined with the mold sections of the other and having opposed engaging faces provided with registering cavities that conform to the exterior of articles to be molded when said faces are engaged, a bar of a size to fit in the spaces between the mold sections and positioned between said supports in alinement with said spaces, said bar having tapered longitudinal edges to facilitate entry of the bar into the spaces between said mold sections, cores carried by said bar and projecting from opposite sides thereof, said cores having free ends from which molded articles may be stripped, said cores being shaped to conform to interiors of articles to be molded and positioned to simultaneously aline with mold cavities, a transverse guideway, a support for said bar mounted to travel along said guideway and movable when said mold sections are separated to carry the cores into and out of the space between the mold sections, and a stop for positioning said support with the cores between the opposed mold sections and in alinement with the cavities thereof.

3. Apparatus for molding hollow rubber articles comprising an upper support, a vertically movable support beneath the upper support, spaced downwardly facing top mold sections carried by the upper support, bottom mold sections alined with the top sections and carried by the movable support, said mold sections having registering cavities that conform to the exterior of the articles to be molded, a bar positioned between said supports and of a size to fit in the spaces between the mold sections, cores shaped to conform to the interiors of said articles, said cores being attached to said bar and projecting in opposite directions therefrom to provide free ends from which articles may be stripped, said bar and attached cores being movable with the vertically movable support into and out of molding position, a carriage having supporting portions underlying said bar to limit the downward movement thereof and to support the same with the attached cores between the mold sections and at a level to clear the same when the movable support is in its lowermost position, and means supporting said carriage for movement horizontally from a position in which the cores are between the mold sections to a stripping position in which the cores are out from between the mold sections and laterally clear of the mold.

4. Apparatus such as defined in claim 3 in which said bar has side faces tapering toward the top and bottom edges of the bar to facilitate entry into the spaces between the mold sections.

5. Apparatus for molding hollow rubber articles comprising an upper support, a vertically movable support beneath the upper support, spaced downwardly facing top mold sections carried by the upper support, bottom mold sections alined with the top sections and carried by the movable support, said mold sections having registering cavities that conform to the exterior of the articles to be molded, a bar positioned between said supports in alignment with the spaces between the mold sections, a core member having opposite end portions shaped to conform to the interior of said articles, said core member having a central portion of reduced diameter rigidly clamped to said bar, said bar and core member being movable with the vertically movable support into and out of molding position, a carriage having supporting portions underlying said bar to limit downward movement of the bar and to support the same with the core member between the mold sections at a level to clear the same when the movable support is in its lowermost position, and means supporting said carriage for movement being movable laterally to carry said bar to a position where the core member is laterally clear of the mold sections.

6. Apparatus for making hollow rubber articles comprising a press having a top platen and a vertically movable bottom platen, mold sections carried by said platens and provided with registering recesses shaped to form a mold cavity conforming to the exterior of an article to be molded, a horizontal track extending across the top of the press, a carriage on said track also extending across the top of the press, a vertically disposed rod suspended from each end of the carriage, a horizontal bar slidable on said rods and extending across the space between said platens, a core attached to said bar and movable therewith to a position in alinement with the recesses of the mold sections, said core having a free outer end from which a molded article may be stripped, and members on said rods for limiting the downward movement of the bar and supporting the same at a level where the core is clear of the mold sections when the bottom platen is in lowered position, the bar and core being movable vertically with the bottom mold section to molding position and horizontally with the carriage to a stripping position where the core is laterally clear of the press.

7. Apparatus for forming hollow rubber articles comprising a press having a top platen and a vertically movable bottom platen, a horizontal track extending across the top of the press, a carriage mounted to travel on said track and also extending across the top of the press, a vertically disposed rod on each side of the press flexibly suspended from said carriage, a horizontal bar slidable vertically on said rods and extending across the space between said platens, supporting members limiting the downward movement of said bar for supporting the bar when the lower platen is in its lowermost position, core members attached to said bar and projecting laterally therefrom, said core members having free outer ends from which molded articles may be stripped, and mold sections carried by said platens and having registering recesses for positioning said core members and forming mold cavities surrounding said core members, said bar and core members being movable vertically with the lower platen into molding position in engagement with the top mold sections and horizontally with the carriage to a stripping position where the core members are laterally clear of the press.

8. Apparatus such as defined in claim 7 in which said core members project horizontally in opposite directions from said bar and in which the mold sections are spaced to receive the core supporting bar between them.

9. Apparatus for making hollow rubber articles comprising a vulcanizing mold having two mold sections relatively movable from an open to a closed position and provided with meeting faces that have registering cavities that conform to the exterior of the article to be molded and a core that conforms to the interior of said article, said mold sections having registering core positioning recesses and said core having portions that fit in said recesses, a carrier positioned laterally clear of the mold sections and rigidly attached to the core to support the same in a position projecting laterally therefrom and clear of the mold sections when the mold is open, and means supporting said carrier for movement in a direction transverse to the axis of the core when the mold is open from a molding position where the core is between the mold sections and alined with the mold cavities to a stripping position where the core is positioned laterally clear of the mold sections.

10. Apparatus for making hollow rubber articles comprising a vulcanizing mold having top and bottom sections with registering cavities that conform to the exterior of the hollow article and a core having an outer end portion that conforms to the interior of the hollow article, said bottom section being movable vertically from an open position to a molding position in engagement with the core and top section, a core carrying member rigidly attached to the core inwardly of the outer end portion and positioned at one side of and laterally clear of said mold sections, said core carrying member being movable vertically to molding position with said bottom section, a carriage having supporting portions underlying said member to support the same with the attached core between the mold sections and at a level to clear the same when the mold is open, and means supporting said carriage for movement horizontally whereby said core carrying member may be shifted when the mold is open from a position where the core is between the mold sections to a position where the core is laterally clear of the mold sections.

11. Apparatus for forming hollow rubber articles comprising a press having a top platen and a vertically movable bottom platen, a horizontal track extending across the top of the press, a carriage on said track also extending across the top of the press, a vertically disposed rod on each side of the press flexibly suspended from said carriage, a horizontal bar slidable on said rods and extending across the space between said platens, stops on said rods limiting the downward movement of said bar for supporting the bar when the lower platen is in its lowermost position, an elongated horizontally disposed core member disposed at right angles to the bar and having a central portion of reduced diameter clamped to the bar, and mold sections carried by said platens and having registering recesses for positioning the core members and forming mold cavities surrounding the end portions of said core members, said bar and core members being movable vertically with the lower platen into molding position in engagement with the top mold sections and horizontally with the carriage to a stripping position where the core members are laterally clear of the press.

HOWARD M. DODGE.

REFERENCES CITED

The following references are of record in the file of this patent:

UNITED STATES PATENTS

| Number | Name | Date |
|---|---|---|
| 1,793,472 | Fredd | Feb. 24, 1931 |
| 1,981,201 | Semler | Nov. 20, 1934 |
| 1,997,074 | Novotny | Apr. 9, 1935 |
| 2,059,387 | Nanfeldt | Nov. 3, 1936 |
| 2,463,560 | Rempel | Mar. 8, 1949 |
| 2,488,935 | Rempel | Nov. 22, 1949 |